United States Patent
Dawson et al.

(10) Patent No.: US 7,797,713 B2
(45) Date of Patent: Sep. 14, 2010

(54) GUI WITH DYNAMIC THUMBNAIL GRID NAVIGATION FOR INTERNET TV

(75) Inventors: Thomas Patrick Dawson, Escondido, CA (US); Ted Mark Dunn, Carlsbad, CA (US); Seth Hill, La Mesa, CA (US); Yuko Nishikawa, La Jolla, CA (US); Rolf Toft, Palo Alto, CA (US); George Williams, Carlsbad, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 414 days.

(21) Appl. No.: 11/850,295

(22) Filed: Sep. 5, 2007

(65) Prior Publication Data
US 2009/0064222 A1 Mar. 5, 2009

(51) Int. Cl.
*G06F 3/00* (2006.01)
*G06F 13/00* (2006.01)
*H04N 5/445* (2006.01)

(52) U.S. Cl. .............. 725/52; 725/37; 725/38; 725/39; 715/838; 348/333.05

(58) Field of Classification Search .......... 725/37–41, 725/44, 51, 52
See application file for complete search history.

(56) References Cited

U.S. PATENT DOCUMENTS

| | | | | |
|---|---|---|---|---|
| 5,953,010 A | * | 9/1999 | Kampe et al. | 715/772 |
| 6,046,740 A | * | 4/2000 | LaRoche et al. | 715/764 |
| 7,539,949 B2 | * | 5/2009 | Hong | 715/838 |
| 2001/0019336 A1 | | 9/2001 | Gordon et al. | |
| 2003/0184598 A1 | * | 10/2003 | Graham | 345/838 |
| 2004/0030741 A1 | | 2/2004 | Wolton et al. | |
| 2004/0135815 A1 | * | 7/2004 | Browne et al. | 345/810 |
| 2005/0251409 A1 | | 11/2005 | Johnson et al. | |
| 2006/0123449 A1 | * | 6/2006 | Ma et al. | 725/58 |
| 2006/0267995 A1 | * | 11/2006 | Radloff et al. | 345/530 |
| 2007/0101364 A1 | | 5/2007 | Morita | |
| 2007/0157228 A1 | * | 7/2007 | Bayer et al. | 725/34 |
| 2008/0235737 A1 | * | 9/2008 | Read | 725/52 |
| 2009/0007188 A1 | * | 1/2009 | Omernick | 725/62 |

* cited by examiner

*Primary Examiner*—Scott Beliveau
*Assistant Examiner*—Jeremy Duffield
(74) *Attorney, Agent, or Firm*—John L. Rogitz

(57) ABSTRACT

An Internet-enabled TV can display thumbnails of audio-video content available from an Internet server for selecting content to be displayed on the TV by a user manipulating a remote control. Internet information loading rules and thumbnail navigation rules are disclosed.

8 Claims, 9 Drawing Sheets

| 1 | 2 | 3 | 4 | 5 |
|---|---|---|---|---|
| 6 | 7 | 8 | 9 | 10 |
| 11 | | | | |

| 16 | 17 | | | |
|---|---|---|---|---|
| 21 | 22 | 21 | 24 | 25 |
| 26 | 27 | 28 | 29 | 30 |

*Fig. 11*

| 16 | 17 | | | |
|---|---|---|---|---|
| 21 | 22 | 21 | 24 | 25 |
| 26 | 27 | 28 | 29 | 30 |

| 16 | 17 | | | |
|---|---|---|---|---|
| 21 | 22 | 21 | 24 | 25 |
| 26 | 27 | 28 | 29 | 30 |

*Fig. 12*

GUI WITH DYNAMIC THUMBNAIL GRID NAVIGATION FOR INTERNET TV

I. FIELD OF THE INVENTION

The present invention relates generally to graphical user interfaces (GUI) with dynamic thumbnail grid navigation for Internet TVs.

II. BACKGROUND OF THE INVENTION

TV manufacturers may wish to provide TVs with built-in interactive devices, e.g., personal video recorders (PVR), optical disk players such as Blu-Ray disk players and digital video disk (DVD) players and the like, so that a customer conveniently need purchase only the TV with interactive devices in a single seamless system. As recognized by the present assignee, it would be further desirable to provide the interactive devices with the TV in modular form so that as new and upgraded interactive devices become available, the TV system may be upgraded by replacing an old module with a new one without having to purchase an entirely new TV system.

The fusion of television with the Internet is a continuing goal that has spawned systems making it convenient for viewers to access content from both conventional TV sources and the Internet using a single TV chassis. In this way, the number of programs that can be made available to people using the familiar technology of television can be expanded enormously.

SUMMARY OF THE INVENTION

Such a fusion, as understood herein, can be resolved using an Internet module in accordance with the discussion above. This is advantageous because while some products may possess the capability to be remotely updated via a software update, a television might not have such a capability. Furthermore, simply updating a product with software or with a new interface has shortcomings, such as not being able to accommodate industry standards for copy protection and not possessing innate mechanisms to restrict access to the interface, which is otherwise required to prevent unapproved devices from being attached to the interface. Accordingly, as recognized herein it is desirable to provide a means for a TV owner to add omitted functionality to the TV while providing the interface to do so with a mechanism for ensuring that only approved devices may be connected.

The present invention further understands that a complete solution may entail a graphic user interface (GUI) that integrates various choices a viewer may wish to make with respect to what is shown on the TV in an easy to use and intuitive fashion that builds on past GUI experiences a user may have had.

Accordingly, a method includes displaying a GUI on a TV, with the GUI being configured to permit a user to select an Internet content source. The method includes receiving a signal from a remote control representing a selection of a source on the GUI and in response to the signal, downloading from the server metadata representing audio-video content streams as well as thumbnails arranged in a grid defined by the server. Each thumbnail represents a respective audio-video content stream. A set of the thumbnails along with metadata can be presented on the TV so that a user can navigate the thumbnails to select a thumbnail using the remote control to thereby cause the respective stream to be downloaded from the server.

The metadata may be downloaded before the thumbnails so that navigation can be permitted only when the metadata is completely downloaded even if the thumbnails are not.

A default thumbnail and/or category and/or video stream may be displayed as the thumbnails are being downloaded. An end user can establish the default thumbnail and/or category and/or video stream, or an advertiser can establish the default thumbnail and/or category and/or video stream.

Non-limiting embodiments of the method may include executing navigation commands received from the remote control using navigation rules keyed not to static grid positions but to existing thumbnails that are available, such that the server can change the grid it downloads without any change or modification to the navigation rules employed. Among the navigation rules employed can be:

(a) when a page down key is pressed, moving a cursor highlight to the same row in a succeeding set of thumbnails as it is on in a current set, but if no corresponding thumbnail exists in the same column of the succeeding set as the cursor is on in the current set, moving the highlight to the next available thumbnail to the left in the row;

(b) when a page up key is pressed, moving a cursor highlight to the same row in a preceding set of thumbnails as it is on in a current set, but if no corresponding thumbnail exists in the same column of the preceding set as the cursor is on in the current set, moving the highlight to the next available thumbnail to the right in the row;

(c) when a down key is pressed and a cursor highlight is in a bottom row of a current set of thumbnails, presenting a succeeding set of thumbnails with the highlight in the top row, and if no corresponding thumbnail exists in the same column of the succeeding set as the highlight is on in the current set, moving the highlight to the next available thumbnail to the left in the row;

(d) when an up key is pressed and a cursor highlight is in a top row of a current set of thumbnails, presenting a preceding set of thumbnails with the highlight in the bottom row, and if no corresponding thumbnail exists in the same column of the preceding set as the highlight is on in the current set, moving the highlight to the next available thumbnail to the right in the row;

(e) when a right key is pressed while the cursor is highlighting a thumbnail without another thumbnail being present to the right of the highlighted thumbnail in the row, highlighting a left-most thumbnail in the next row down; and (f) when a left key is pressed while the cursor is highlighting a thumbnail without another thumbnail being present to the left of the highlighted thumbnail in the row, highlighting a right-most thumbnail in the next row up.

In another aspect a tangible digital storage medium can be read by a computer processor to display on a TV a grid of thumbnails. Each thumbnail represents a respective audio-video stream. The grid with its dimensions are received from an Internet server. A user can navigate the grid to select a stream for downloading to the TV. Navigation is effected using navigation rules keyed to existing thumbnails that are available from the server, such that the server can change the grid it downloads without any change or modification to the navigation rules employed.

In still another aspect, a TV is engaged with a hardware network module that communicates using high definition multimedia interface (HDMI) to provide content from the Internet to the TV. A processor causes a navigable thumbnail grid to be displayed on the TV, with the grid being navigable by means of rules keyed to thumbnails actually downloaded in the grid.

The details of the present invention, both as to its structure and operation, can best be understood in reference to the accompanying drawings, in which like reference numerals refer to like parts, and in which:

BRIEF DESCRIPTION OF THE DRAWINGS

FIGS. 4-16 show on-screen GUIs illustrating thumbnail navigation rules, with white boxes representing existing thumbnails that do not have a cursor positioned on them, black boxes indicating null fields, i.e., that no thumbnails exist in those locations of the thumbnail grid, and hatched boxes representing existing thumbnails that have a cursor positioned on them.

DETAILED DESCRIPTION OF THE PREFERRED EMBODIMENT

Figure 1:
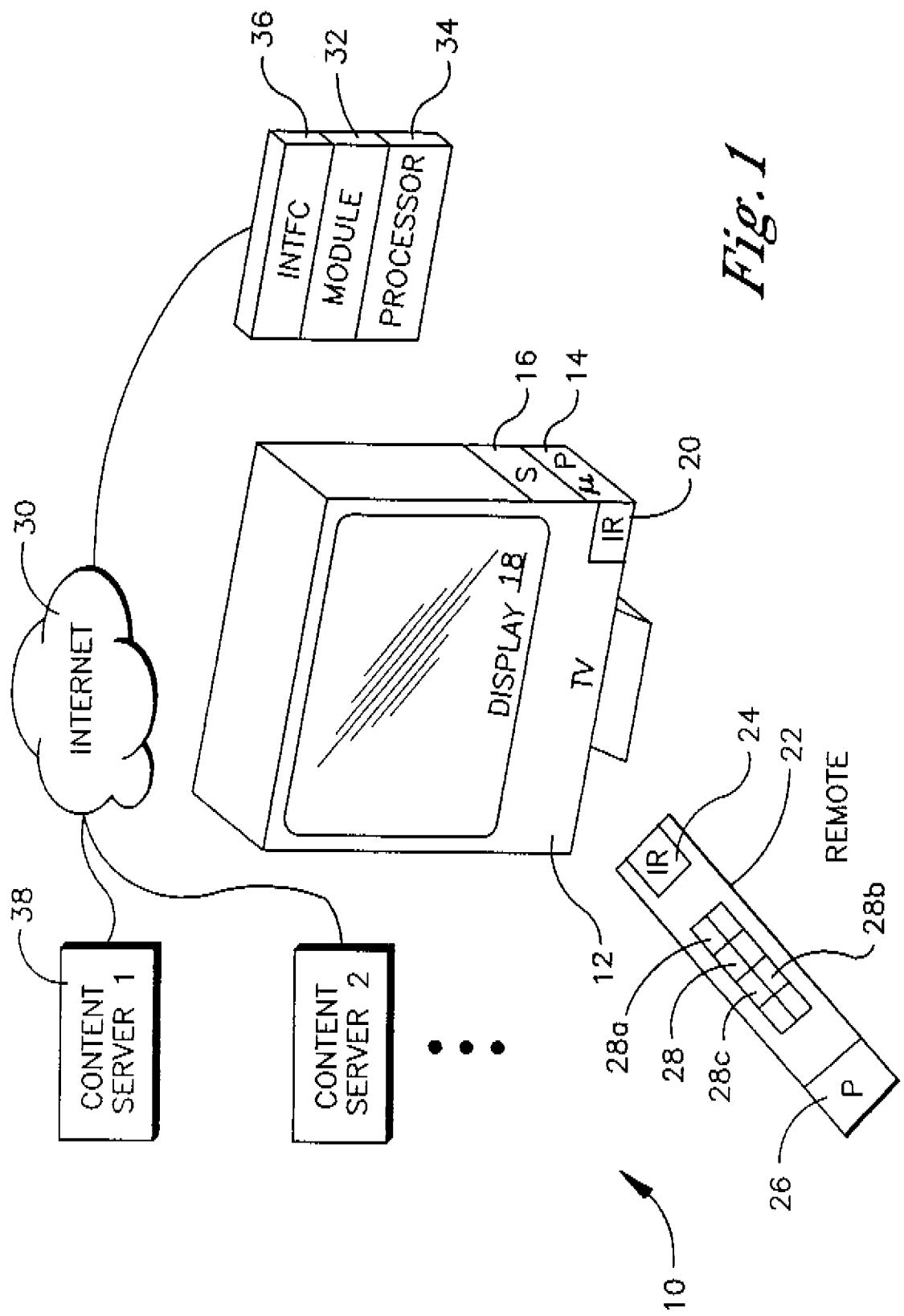
FIG. 1 is a schematic view of a non-limiting system in accordance with present principles.

Referring initially to FIG. 1, a system is shown, generally designated 10, that includes a TV 12 with TV processor 14 and tangible digital storage medium 16 that may be, without limitation, a magnetic or optical disk drive, a solid state device such as random access memory or read-only memory or flash memory, a removable stick medium or removable floppy disk, etc. The medium 16 and processor 14 may be stored in the TV housing as shown along with a display 18 such as but not limited to a high definition (HD) matrix display or a standard definition cathode ray tube display, or the processor 14 and/or medium 16 may be external to the TV housing, e.g., in a set-top box or in the below-discussed module.

The TV 12 typically includes a wireless receiver such as but not limited to an IR receiver 20 for receiving wireless signals from a hand-held remote control 22 having a wireless transmitter such as but not limited to an IR transmitter 24. A processor 26 in the remote control 22 can receive input from a user-manipulable key array 28 in accordance with principles known in the art to cause the transmitter 24 to send wireless signals to the TV 12, including cursor control signals to move a cursor on the display 18. The key array 28 can include page up/page down cursor control keys 28a, up/down cursor control keys 28b, and left/right cursor control keys 28c, as well as alpha-numeric keys and other typical TV remote control keys.

In the non-limiting embodiment shown in FIG. 1, audio-video content from a wide area computer network such as the Internet 30 can be provided to the TV 12 for presentation on the display 18 using a hardware module 32 that may have a module processor 34. The module 32 may communicate with the TV 12 using a communication interface 36 such as a high definition multimedia interface (HDMI) to provide content from the Internet to the TV. The module 32 may be physically engaged with the housing of the TV 12 with communication being established by respective connectors on the module and TV and indeed may be integrated inside the TV housing, or the module 32 may be connected via a cord to the TV 12. In any case, the module 32 can be connected to the Internet typically by a computer cable that extends from the housing of the module 32 to an Internet jack, although the module 32 alternatively may communicate with the Internet wirelessly using, e.g., Wi-Fi.

As set forth further below, audio-video content may be provided from one or more content servers 38 on the Internet 30 via the module 32 for presentation on the TV display 18. The GUT logic and thumbnail navigation logic discussed further below may be implemented by one or both of the processors 14, 34 executing instructions on tangible digital storage media such as but not limited to the storage 16.

Figure 2:
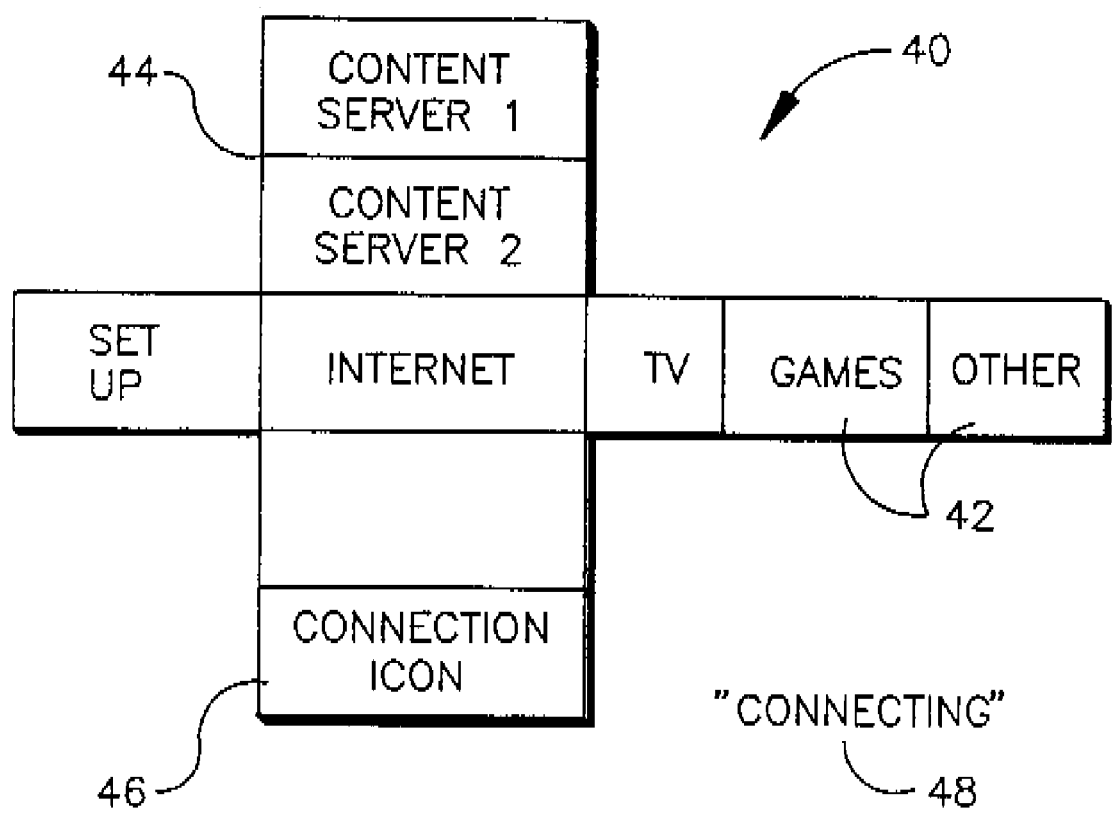
FIG. 2 shows a GUI in accordance with present principles that may be displayed on screen.

FIG. 2 shows a non-limiting implementation of a graphical user interface (GUI) 40 that can be generated in the module 32 and/or TV 12 and presented on the TV display 11. The implementation shown in FIG. 2 is colloquially referred to as a "cross media bar" or "XMB". As shown, plural icons 42 are presented in an ordered horizontal list, with associated alpha-numeric application labels presented next to at least some of the icons 42 if desired. The icons 42 may be category icons, indicating, e.g., "set up", "Internet" (or equivalently "my videos"), "TV", "games", etc. When the screen cursor is positioned over one of the icons 42, a vertical bar 44 is shown representing sub-menu choices for the particular icon 42 that is "in focus" by virtue of the screen cursor being positioned over it. A user can select items on the GUI 40 by manipulating the remote control 22.

As shown in FIG. 2, when "Internet" is selected on the XMB a network status icon 46 can be shown on the vertical bar 44. Also, next to the network status icon 46, a text message 48 can be presented that relates to network status. In non-limiting implementations the text message 48 indicates whether a connection with the network is being attempted as shown, and may include an advisory that the task may consume some time. Messages 48 may also be displayed that updates are being checked for on the network, that authentication with the network is being undertaken, that services are being acquired from the network, and that an acquired service is being retrieved from the network.

In accordance with present principles, the status icon 46 is dynamically updated according to network status without user interaction. For example, when no network communication exists, the icon 46 can have a red color, whereas upon establishing communication with one of the servers 38 the icon 46 can assume a green color. Other appearance changes may be used. However, the status icon 46 may not be presented on the display 18 at all when, for instance, a network cable connecting the module 32 to an Internet jack is unplugged. Thus, in the non-limiting example described above the status icon 46 appears only when the module 32 is connected to the Internet and will assume a red color prior to establishing proper authenticated communication with a server 38, at which time the icon 46 can turn green.

Figure 3:
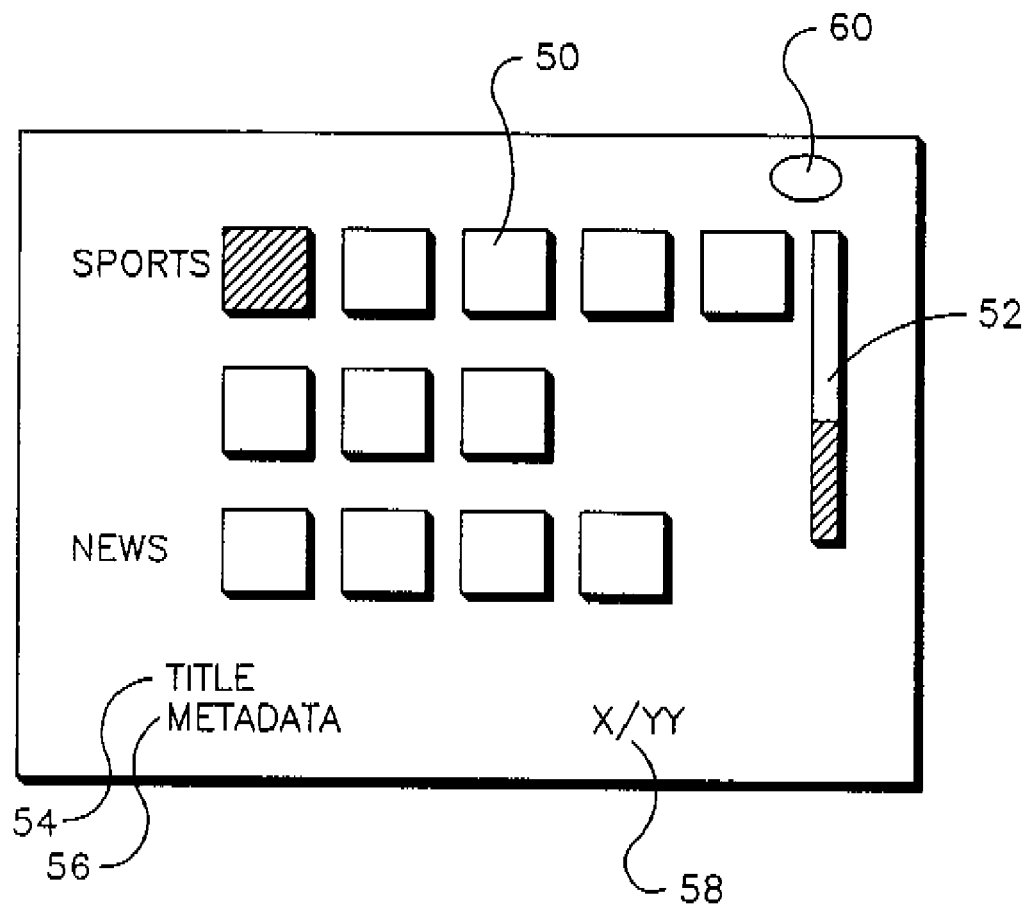
FIG. 3 shows a GUI that can be displayed in response to selecting one of the content servers shown in FIG. 2.

Turning now to FIG. 3, when one of the content server icons in the vertical bar 44 shown in FIG. 2 is selected, thumbnails 50 and other information associated with audio-video content on that server are displayed on the TV display 18. The thumbnails 50 are displayed in navigable grid as shown, and preferably are arranged by category. In the non-limiting embodiment shown the first two rows of thumbnails are in the sports category and each thumbnail can represent, e.g., a respective Internet sports broadcast. The third row as shown can be a news category in which each thumbnail represents a respective news web site or broadcast. Only "N" rows (e.g., three) of thumbnails typically are displayed at one time on the display 18 with each row including "M" (e.g., five) thumbnails. Additional unshown thumbnail rows in the grid can be displayed by positioning a screen cursor over an up/down scroll bar 52 and moving the scroll bar using the remote control 22, it being understood that if no unshown rows exist the scroll bar 52 may be removed from the display 18. With the highlight on a thumbnail of a desired audio-video stream, the viewer can manipulate the remote control to send a select signal to the TV, which causes the stream to be downloaded from the server and played or stored on the TV.

The hatched thumbnail 50 represents the thumbnail over which the cursor is positioned. The title of the underlying audio-video stream is indicated on the display 18 as indicated at 54, with associated metadata being displayed as indicated at 56. The metadata can include, for example, the title 54, the rating of the content, its popularity, and Internet links associated with the content, along with the dimensions of the thumbnail grid being downloaded, i.e., the number of rows and columns and the number of available thumbnails in each row. Thus, the metadata can also include an indication 58 of the sequential number ("x") of the selected thumbnail in the total number ("yy") of thumbnails available. In addition, a load icon 60 may be presented on the display 18 in accordance with disclosure below.

The thumbnails and metadata can be received by the module 32 from the selected content server. This means that the grid of thumbnails is dynamic in that it is established by each server for that server's content, and consequently is not known in advance by the module 32 or TV 12. The metadata is loaded first and thus is relatively quickly known to the module 32, and then the thumbnails can trickle down. The load icon 60 can be displayed with accompanying status text; when the metadata is loading as indicated by the load icon 60, navigation around the GUI using the remote control 22 may be disabled, but once the load icon indicates that the metadata load is complete e.g., by its removal from the display 18 and the thumbnails 50 start to trickle on screen, navigation can be permitted even before the thumbnail grid completely loads, since the grid dimensions are known from the metadata as described above.

The user may be permitted (in, e.g., the set-up menu) to establish which category of thumbnails to display first, or a user-defined default icon or video may be displayed as thumbnails load so that the user is temporarily given something to watch as the thumbnail grid loads. Yet again, the first or default thumbnail or interim loading video sent from the Internet server to the module 32 for display may be established by an advertiser or other provider who pays the Internet server entity or TV manufacturer and/or module 32 manufacturer for the privilege.

Because the layout of the thumbnail grid varies from server to server, universal GUI navigation rules preferably are applied by the executing processor 14/34. FIGS. 4-16 illustrate non-limiting navigation rules in accordance with present principles. The rules may be implemented by state-based logic or by decision tree logic.

Figure 4:
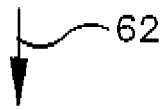

Starting with FIG. 4, when a page up or down key 28a is manipulated, the current "N" rows of thumbnails are removed and the appropriate next "N" rows (depending on whether page up or page down is selected) are displayed. In the following examples, three rows are displayed at one time, it being understood that greater or fewer rows may be displayed at one time on the display 18.

Figures 5, 6:
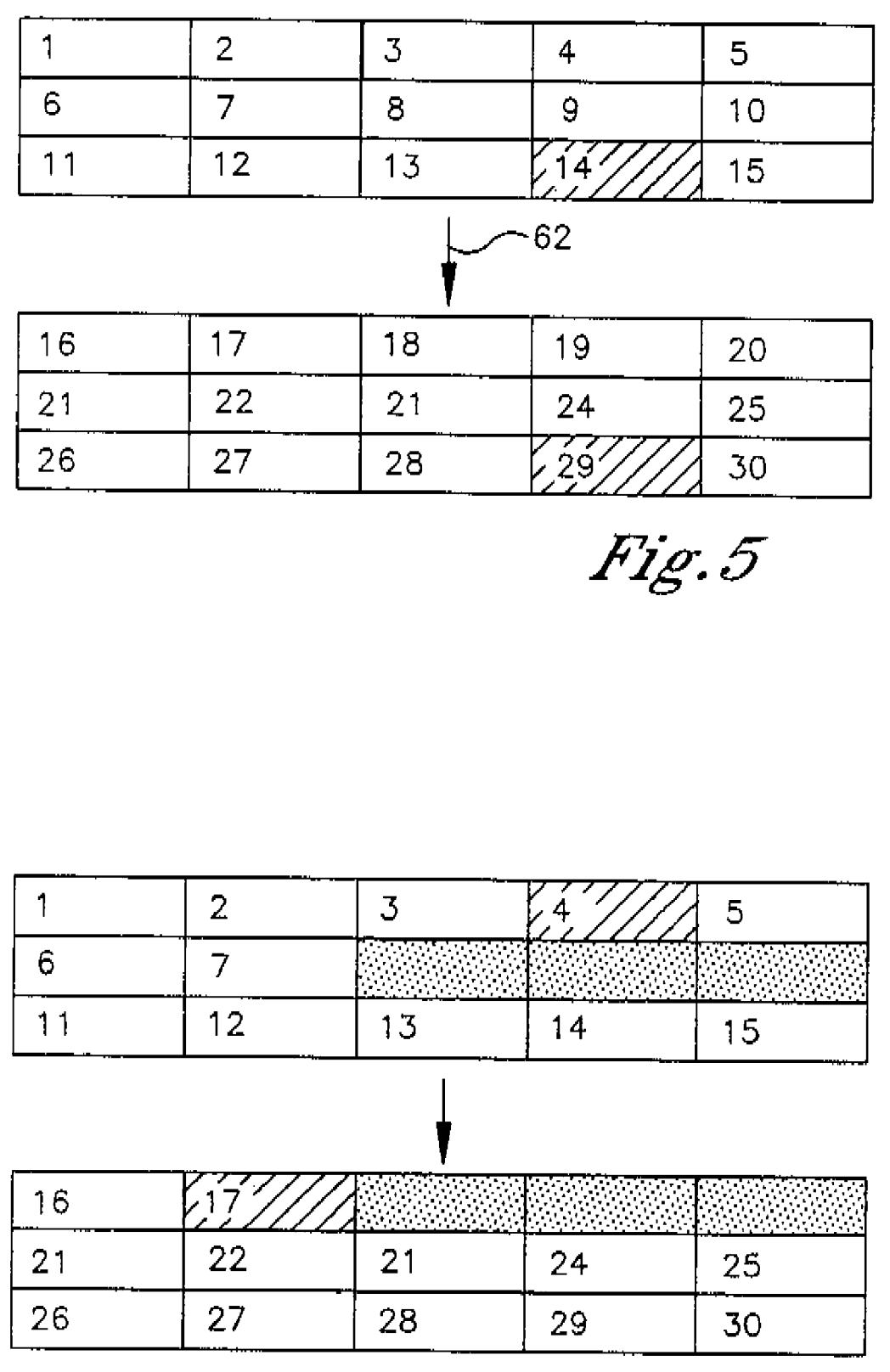

When a page up/down key is manipulated, the cursor highlight attempts to land on the same row and column in the subsequent set of thumbnails as it is on in the current set when the key is pressed. Thus, as shown in FIG. 4 when the cursor is on thumbnail #3 in the first row of three rows and a page down key is pressed, as indicated by the arrow 62 the highlighted thumbnail will be the third thumbnail in the first row of the succeeding set of displayed thumbnails assuming one exists in the grid. In this case, the eighteenth thumbnail in the sequence is highlighted. Likewise, as shown in FIG. 5 and indicated by the arrow 64, when the highlight is not on the first row and a page up/down key is pressed, the highlight moves to the same row and column in the succeeding set of "N" thumbnails.

Figure 7:

However, the grid may have empty thumbnail slots. Accordingly, as shown in FIG. 6, when the page down key is pressed the highlight remains on the same row in the succeeding set of thumbnails, but if no corresponding thumbnail exists in the same column, the highlight is shifted to the next available thumbnail to the left in the row. Likewise, as shown in FIG. 7, when the page up key is pressed the highlight remains on the same row in the preceding set of thumbnails, but if no corresponding thumbnail exists in the same column, the highlight is shifted to the next available thumbnail to the left in the row.

Figure 8:
Figure 9:

FIG. 8 illustrates navigation rules when up/down arrows 28b are manipulated. In general, manipulating an up or down key moves the cursor to the thumbnail in the same column in the immediately adjacent row. Accordingly, when the middle thumbnail of the bottom row in the set that is displayed is highlighted and the down key is pressed, the middle thumbnail in the first row of the next set of thumbnails is highlighted, as indicated in FIG. 8. FIG. 9 illustrates the opposite case when the up key is pressed.

Figure 10:

However, the grid may have empty thumbnail slots. Accordingly, as shown in FIG. 10, when the down key is pressed and the highlight is in the bottom row of the current set, the next set of "N" thumbnails is presented with the highlight in the top row, but if no corresponding thumbnail exists in the same column, the highlight is shifted to the next available thumbnail to the left in the row. Likewise, as shown in FIG. 11, when the up key is pressed the highlight moves to the next higher row and if no corresponding thumbnail exists in the same column, the highlight is shifted to the next available thumbnail to the left in the row of the preceding set.

FIG. 12 further illustrates the above principle. Unlike FIGS. 4-11, 15, and 16, which show succeeding sets of thumbnails, in FIGS. 12-14 the same set of thumbnails is shown twice. When the highlight is in the middle row and the up key is pressed and there is no thumbnail in the top row, the next available thumbnail to the left in the top row is selected for highlighting.

Figure 13:
Figure 14:
Figure 15:

FIGS. 13-15 illustrate navigation rules related to the left/right keys 28c. The default rule is to highlight the next thumbnail to the right in the same row when the right key is pressed, and vice-versa for the left key. However, as shown in FIG. 13 when the highlight is on a thumbnail and the right key is pressed without another thumbnail being present to the right in the row, the left-most thumbnail in the next row down is highlighted. Similarly, as shown in FIG. 14 when the highlight is on a thumbnail and the left key is pressed without another thumbnail being present to the left in the row, the right-most thumbnail in the next row up is highlighted.

Figure 16:

FIG. 15 illustrates the special case that when the right-most thumbnail in the bottom row is highlighted and the right key is pressed, the next set of thumbnails is displayed with the cursor on the left-most thumbnail in the top row of the next set. FIG. 16 illustrates the special case that when the left-most thumbnail in the top row is highlighted and the left key is pressed, the preceding set of thumbnails is displayed with the cursor on the right-most thumbnail in the bottom row. In any case, the cursor never lands on a null field (represented by the darkened-out portions in the figures) because the navigation rules are keyed not to static grid positions but to existing thumbnails that are available. Thus, the Internet server can change the grid it downloads to the module 32 without any change or modification to the navigation rules employed to navigate around the grid.

While the particular GUI WITH DYNAMIC THUMBNAIL GRID NAVIGATION FOR INTERNET TV is herein shown and described in detail, it is to be understood that the subject matter which is encompassed by the present invention is limited only by the claims.

What is claimed is:

1. A method, comprising:
   at a TV, displaying a GUI configured to permit a user to select an Internet content source;
   receiving a signal from a remote control representing a selection of a source on the GUI;
   in response to the signal, downloading from a server metadata representing audio-video content streams;
   in response to the signal, downloading from the server thumbnails arranged in a grid defined by the metadata from the server, each thumbnail representing a respective audio-video content stream;
   presenting at least a set of the thumbnails along with metadata on the TV; and
   allowing a user to navigate the thumbnails to select a thumbnail using the remote control to thereby cause the respective stream to be downloaded from the server, wherein the thumbnails and metadata are received from the server such that the grid of thumbnails is dynamic in that it is established by a server for that server's content, and consequently is not known in advance by the TV, the metadata being loaded first prior to the thumbnails first, and then the thumbnails trickling down from the server, a load icon being displayed with accompanying status text, furthermore wherein when the metadata is loading as indicated by the load icon, navigation around the GUI using the remote control is disabled, and once the load icon indicates that metadata load is complete and the thumbnails start to appear on screen, navigation around the GUI is permitted even before the thumbnail grid completely loads, the grid dimensions being known from the metadata.

2. The method of claim 1, comprising displaying a default thumbnail and/or category and/or video stream as the thumbnails are being downloaded.

3. The method of claim 1, comprising allowing an end user to establish a default thumbnail and/or category and/or video stream.

4. The method of claim 1, comprising allowing an advertiser to establish a default thumbnail and/or category and/or video stream.

5. The method of claim 1, comprising executing navigation commands received from the remote control using navigation rules keyed not to static grid positions but to existing thumbnails that are available, such that the server can change the grid it downloads without any change or modification to the navigation rules employed.

6. A system, comprising:
   a TV;
   a hardware network module engageable with the TV and communicating therewith using high definition multimedia interface (HDMI) to provide content from the Internet to the TV; and
   at least one processor causing a navigable thumbnail grid to be displayed on the TV, the grid being navigable by means of rules keyed to thumbnails actually downloaded in the grid, wherein the rules include:
   (a) when a page down key is pressed with a cursor highlight on a thumbnail in a current set of thumbnails and no corresponding thumbnail exists in the same column of a succeeding set of thumbnails as the cursor is on in the current set, moving the highlight to the next available thumbnail to the left in the row;
   (b) when a page up key is pressed, with a cursor highlight on a current set and no corresponding thumbnail exists in the same column of a preceding set of thumbnails as the cursor is on in the current set, moving the highlight to the next available thumbnail to the right in the row;
   (c) when a down key is pressed with a cursor highlight is in a bottom row of a current set of thumbnails and no corresponding thumbnail exists in the same column of a succeeding set of thumbnails as the highlight is on in the current set, moving the highlight to the next available thumbnail to the left in the row; and
   (d) when an up key is pressed and a cursor highlight is in a top row of a current set of thumbnails and no corresponding thumbnail exists in the same column of a preceding set of thumbnails as the highlight is on in the current set, moving the highlight to the next available thumbnail to the right in the row.

7. The system of claim 6, wherein a GUI configured to permit a user to select an Internet content source is displayed and in response to a selection of the source, metadata representing audio-video content streams and thumbnails representing respective audio-video content streams are downloaded from the source and presented on the TV to allow a user to navigate the thumbnails to select a thumbnail using the remote control to thereby cause the respective stream to be downloaded from the server.

8. The system of claim 7, wherein the metadata is downloaded before the thumbnails, navigation being permitted only when the metadata is completely downloaded even if the thumbnails are not.

* * * * *